United States Patent
Lim et al.

(10) Patent No.: US 9,112,650 B2
(45) Date of Patent: Aug. 18, 2015

(54) SYSTEM AND METHOD FOR TRANSMITTING DATA IN A MULTI-CELL NETWORK

(75) Inventors: Jong Bu Lim, Yongin-si (KR); Young-ho Jung, Goyan-si (KR); Hyo Sun Hwang, Seoul (KR); Hyun Gi Ahn, Incheon (KR); Hyun Ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 806 days.

(21) Appl. No.: 12/818,679

(22) Filed: Jun. 18, 2010

(65) Prior Publication Data

US 2011/0110285 A1    May 12, 2011

(30) Foreign Application Priority Data

Nov. 6, 2009    (KR) .................. 10-2009-0106984

(51) Int. Cl.
*H04L 5/00* (2006.01)
*H04B 7/02* (2006.01)
*H04L 27/26* (2006.01)

(52) U.S. Cl.
CPC .......... *H04L 5/0035* (2013.01); *H04L 5/0069* (2013.01); *H04B 7/022* (2013.01); *H04L 5/0007* (2013.01); *H04L 27/2607* (2013.01); *H04L 27/2655* (2013.01)

(58) Field of Classification Search
CPC .................................................. H04L 5/0035
USPC .................... 370/203, 312, 330, 350, 503
See application file for complete search history.

(56) References Cited

U.S. PATENT DOCUMENTS

| | | | | |
|---|---|---|---|---|
| 7,110,349 | B2* | 9/2006 | Branlund et al. | 370/203 |
| 7,672,339 | B2* | 3/2010 | Ahn et al. | 370/503 |
| 8,448,036 | B2* | 5/2013 | Cai et al. | 714/748 |
| 2007/0091785 | A1 | 4/2007 | Lindoff et al. | |
| 2007/0230479 | A1* | 10/2007 | Liu | 370/395.52 |
| 2008/0043613 | A1 | 2/2008 | Yang et al. | |
| 2008/0076432 | A1* | 3/2008 | Senarath et al. | 455/442 |
| 2008/0165866 | A1 | 7/2008 | Teo et al. | |
| 2008/0260064 | A1 | 10/2008 | Shen et al. | |
| 2008/0273547 | A1* | 11/2008 | Phinney | 370/437 |
| 2009/0175260 | A1* | 7/2009 | Wang et al. | 370/350 |
| 2010/0111031 | A1* | 5/2010 | Kim et al. | 370/330 |
| 2010/0128693 | A1* | 5/2010 | Ahn et al. | 370/330 |

FOREIGN PATENT DOCUMENTS

| | | |
|---|---|---|
| KR | 10-2006-0050068 | 5/2006 |
| KR | 10-2006-0073257 | 6/2006 |
| KR | 10-2008-0112077 | 12/2008 |

OTHER PUBLICATIONS

Chang, et al., "A Downlink Spectral Efficiency Improvement Scheme Using Intercell Cooperative Spatial Multiplexing and Beamforming," *Journal of IEEE*, Jul. 21, 2008, Issue 2008-45TC-7-7, The Institute of Electronics Engineers of Korea, Seoul, Korea, pp. 542-549.

* cited by examiner

*Primary Examiner* — Christopher Grey
(74) *Attorney, Agent, or Firm* — NSIP Law

(57) ABSTRACT

A communication system and method that receives data from a terminal using a cooperative reception scheme, is provided. Each terminal may generate multi-cell transmission data used for overcoming transmission delay and transmit, to each base station, a data frame including the multi-cell transmission data.

17 Claims, 10 Drawing Sheets

SYSTEM AND METHOD FOR TRANSMITTING DATA IN A MULTI-CELL NETWORK

CROSS-REFERENCE TO RELATED APPLICATION(S)

This application claims the benefit under 35 U.S.C. §119(a) of Korean Patent Application No. 10-2009-0106984, filed on Nov. 6, 2009, in the Korean Intellectual Property Office, the entire disclosure of which is incorporated herein by reference for all purposes.

BACKGROUND

1. Field

The following description relates to a technique in which a plurality of base stations may cooperatively receive data from a terminal.

2. Description of Related Art

To receive data from a terminal, there has been suggested a cooperative reception scheme in which several cooperative base stations located around the terminal, as well as a serving base station connected with the terminal, may cooperatively receive data from the terminal. In this cooperative reception scheme, a plurality of base stations may simultaneously receive data with respect to a corresponding terminal using the same radio resources. When an error occurs in a part of the data received by each of the plurality of base stations, each of the plurality of base stations may determine that the data reception fails.

In the cooperative reception scheme, each of the plurality of base stations may receive data from a terminal of a corresponding base station, or from a terminal of a cooperative base station. However, when a base station receives data from a terminal of a cooperative base station, a transmission delay occurring in the data received from respective terminal may be relatively great, thus preventing the base station from accurately and completely receiving a data signal transmitted from the terminal.

SUMMARY

In one general aspect, there is provided a terminal including a transmission data generating unit to generate multi-cell transmission data by repeating a data group including a plurality of data bits, and a transmission unit to transmit the multi-cell transmission data including the repeated data group to a plurality of base stations.

The terminal may further include a cyclic prefix unit to generate a cyclic prefix signal using at least one bit of the plurality of data bits, and a frame generation unit to generate an uplink frame by time-division multiplexing the cyclic prefix signal and the multi-cell transmission data.

The terminal may further include a receiving unit to receive downlink data from a serving base station and a cooperative base station, from among the plurality of base stations, and an error determination unit to determine whether an error of the downlink data occurs, wherein the plurality of data bits includes information about whether an error of the downlink data occurs.

The terminal may further include a modulation unit to modulate uplink data in an orthogonal frequency division multiplexing (OFDM) scheme, and a data bit selecting unit to select the plurality of data bits from the uplink data based on an order of carrier frequencies of the uplink data.

The data bit selecting unit may select uplink data having an odd-numbered carrier frequency, as the plurality of data bits, or may select uplink data having an even-numbered carrier frequency, as the plurality of data bits.

The terminal may further include a receiving unit to receive, from a serving base station included in the plurality of base stations, a maximum transmission delay value, wherein the data bit selecting unit selects the plurality of data bits in accordance with the maximum transmission delay value.

In another aspect, there is provided a base station including a receiving unit to receive, from a plurality of terminals, multi-cell transmission data generated by repeating a data group including a plurality of data bits, a window setting unit to set a total window duration with respect to receiving the multi-cell transmission data based on transmission delay values from each of the plurality of terminals, and a restoration unit to restore the data group using the multi-cell transmission data corresponding to the total window duration.

The window setting unit may determine, as a starting time of a first window duration, a maximum value from the transmission delay values, and determines, as an end time of the first window duration, an end point in time of the multi-cell transmission data, may set, as a second window duration, data bits not included in the first window duration from among the repeated data groups, and may set, as the total window duration, the first window duration and the second window duration.

The base station may further include a transmission unit to transmit downlink data to the plurality of terminals, and a receiving unit to receive the plurality of data bits including information about whether an error of the downlink data occurs.

In another aspect, there is provided a data transmission method including generating multi-cell transmission data by repeating a data group including a plurality of data bits, and transmitting the multi-cell transmission data including the repeated data group to a plurality of base stations.

The data transmission method may further include generating a cyclic prefix signal using at least one bit of the plurality of data bits, and generating an uplink frame by time-division multiplexing the cyclic prefix signal and the multi-cell transmission data, wherein the transmitting transmits the uplink frame.

The data transmission method may further include receiving downlink data from a serving base station and a cooperative base station, from among the plurality of base stations, and verifying whether an error of the downlink data occurs, wherein the plurality of data bits includes information about whether an error of the downlink data occurs.

The data transmission method may further include modulating uplink data in an OFDM scheme, and selecting the plurality of data bits from the uplink data based on a carrier frequency of the uplink data.

The selecting may select uplink data having an odd-numbered carrier frequency, as the plurality of data bits, or may select uplink data having an even-numbered carrier frequency, as the plurality of data bits.

The data transmission method may further include receiving a maximum transmission delay value from a serving base station included in the plurality of base stations, wherein the selecting selects the plurality of data bits in accordance with the maximum transmission delay value.

In another aspect, there is provided a computer-readable storage medium having stored therein program instructions to cause a processor to implement a data transmission method including generating multi-cell transmission data by repeating a data group including a plurality of data bits, and transmitting the multi-cell transmission data to including the repeated data group to a plurality of base stations.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1A:
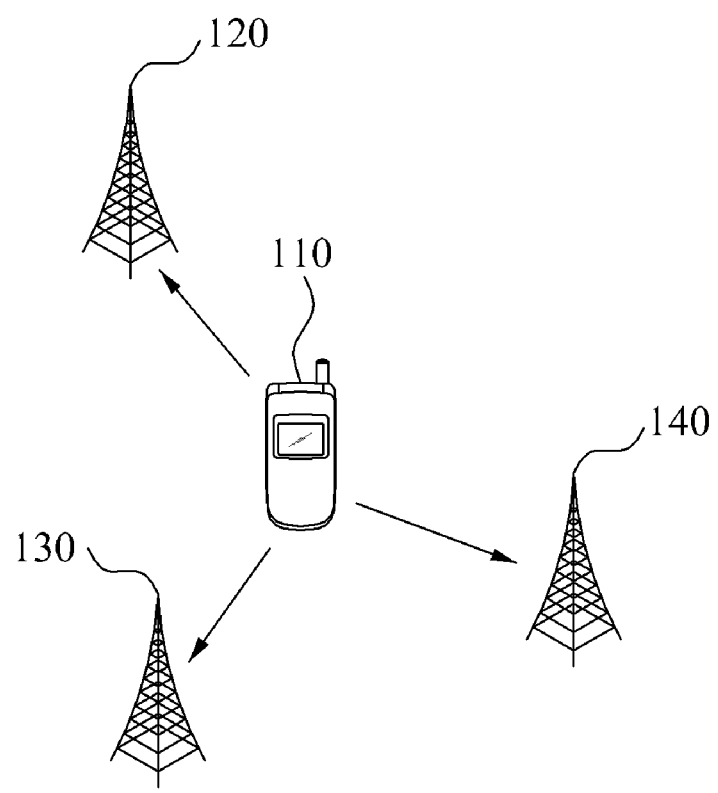
FIG. 1A is a diagram illustrating an example of a plurality of base stations receiving data from a terminal, according to a cooperative reception scheme.

FIG. 1A illustrates an example of a plurality of base stations receiving data from a terminal, according to a cooperative reception scheme.

Referring to FIG. 1A, a terminal 110 may be connected with a serving base station 120. The terminal 110 may transmit uplink data to the serving base station 120 as well as the cooperative base stations 130 and 140. The serving base station 120 and the cooperative base stations 130 and 140 may be connected with one another, for example, using a backhaul link. The serving base station 120 and the cooperative base stations 130 and 140 may respectively decode signals received from the terminal 110.

When the serving base station 120 succeeds in decoding the signal received from the terminal 110, a reception procedure based on the cooperative reception scheme may be terminated. However, when the serving base station 120 fails in the decoding of the signal received from the terminal 110, the cooperative base stations 130 and/or 140 may transmit, to the serving base station 120, signals which the cooperative base stations 130 and/or 140 received from the terminal 110.

The serving base station 120 may again decode the signal received from the terminal 110 based on signals received from the cooperative base stations 130 and/or 140. As illustrated in FIG. 1A, the respective cooperative base stations 130 and 140 may receive uplink data from the terminal 110 connected with the serving base station 120, and provide the uplink data to the serving base station 120 when the serving base station 120 fails to accurately and completely receive the uplink data from the terminal 110.

Figure 1B:
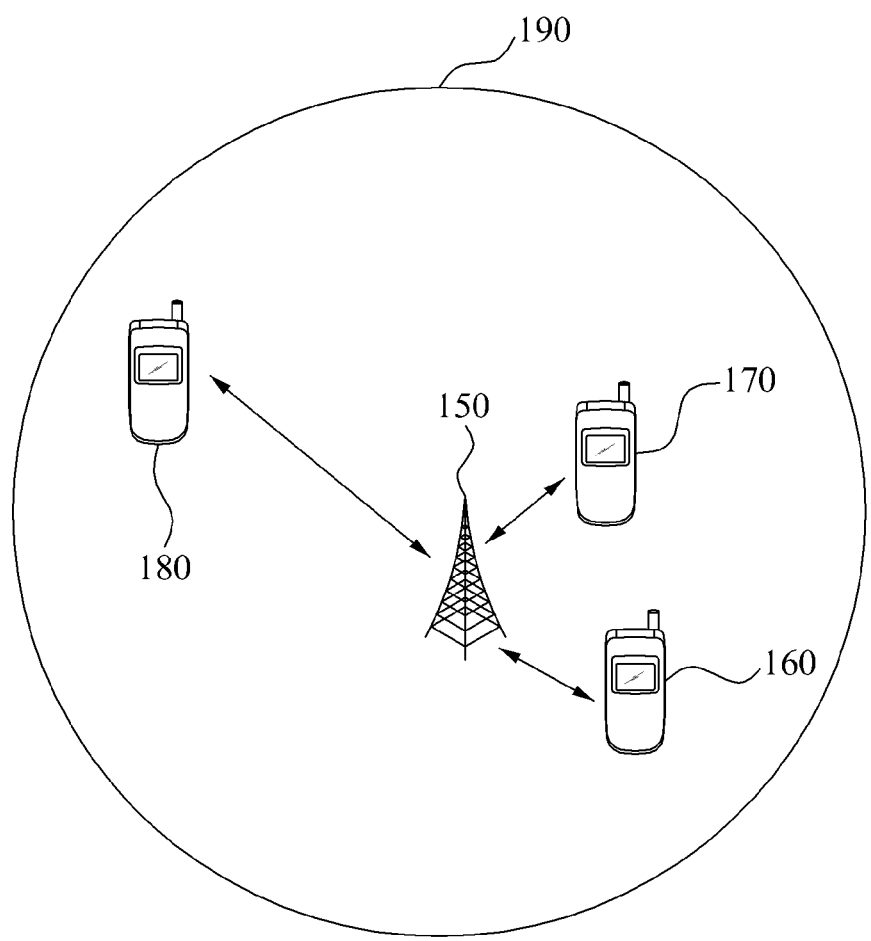
FIG. 1B is a diagram illustrating an example of a base station receiving uplink data from a plurality of terminals.

FIG. 1B illustrates an example of a base station receiving uplink data from a plurality of terminals. Referring to FIG. 1B, a plurality of terminals 160, 170, and 180 are located within a coverage area 190 of a cooperative base station 150. In this example, terminals 160 and 170 are communicating with the cooperative base station 150, and the terminal 180 is communicating with a separate serving base station. When using the cooperative reception scheme, the cooperative base station 150 may receive the uplink data from the terminal 180 communicating with the serving base station as well as the terminals 160 and 170 communicating with the cooperative base station 150.

In this example, a transmission delay designates a time period during which the cooperative base station 150 receives the uplink data, after the respective terminals 160, 170, and 180 transmit the uplink data. In this example, the terminal 160 is separated by a relatively short distance from the cooperative base station 150, and thus the transmission delay is relatively small. Meanwhile, the terminal 180 is separated by a relatively large distance from the cooperative base station 150, and thus, the transmission delay between the terminal 180 and the cooperative base station 150 is larger than the transmission delay between the terminal 160 and the cooperative base station 150.

Figure 2:
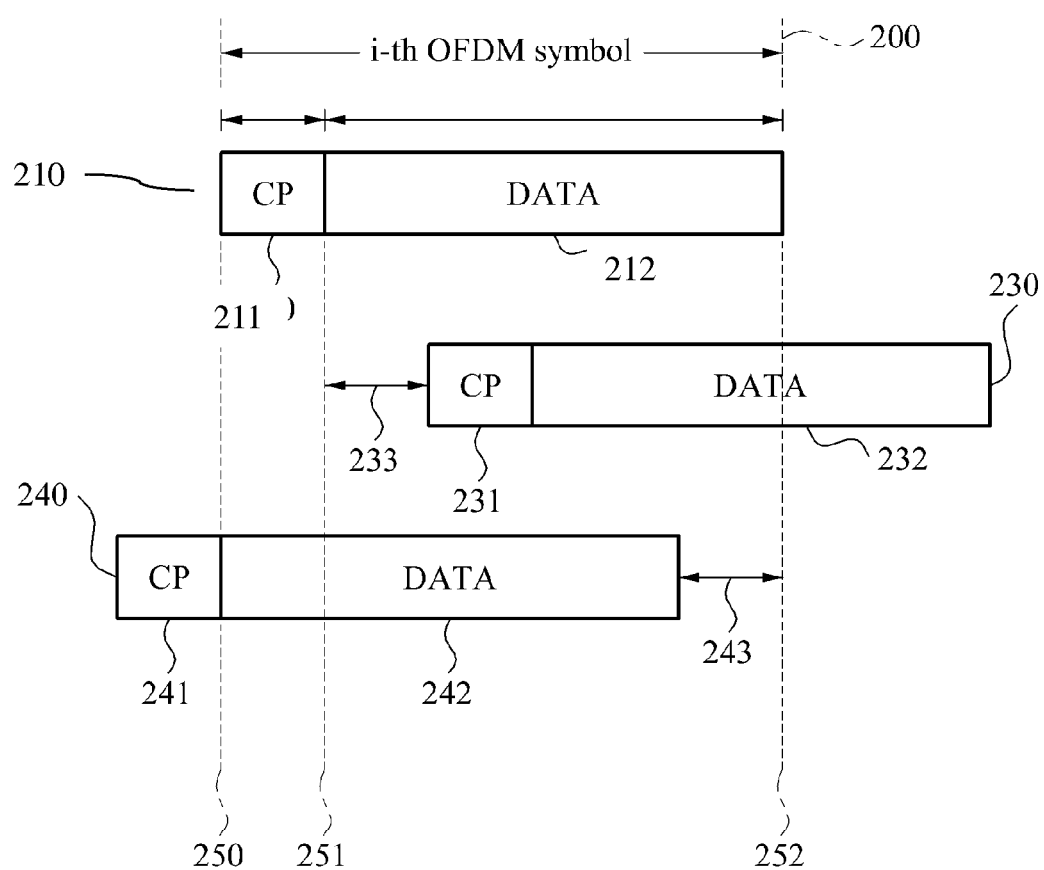
FIG. 2 is a diagram illustrating a transmission delay with respect to data received from respective terminals when using a cooperative reception scheme.

FIG. 2 illustrates a transmission delay with respect to data received from respective terminals when using a cooperative reception scheme. Referring to FIG. 2, the terminal may modulate uplink data, for example, using an orthogonal frequency division multiplexing (OFDM) scheme. The transmission delay from the respective terminals may be determined based on a distance between the respective terminals and a cooperative base station. Accordingly, the transmission delay from the respective terminals may have different values according to different distances.

As illustrated in FIG. 2, the uplink data may be received from three terminals. In this example, the three terminals are each separated from the cooperative base station by different distances. OFDM symbols 210, 230, and 240 transmitted from the respective terminals may include CP signals 211, 231, and 241 and uplink data 212, 232, and 242.

The cooperative base station may set a window duration with respect to signals received from the respective terminals, and decode signals corresponding to the set window duration. When a difference in the transmission delay from the respective terminals is greater than a magnitude of the CP signals 211, 231, and 241, the uplink data 212, 232, and 242 received from the respective terminals may or may not be included in an identical window duration.

In this example, a window duration is set as a duration ranging from a starting time 251 and an end time 252 with respect to transmission of the data 212 of the first symbol 210 that is transmitted by a first terminal.

In this example, a second symbol 230 transmitted by a second terminal has a transmission delay value greater than that of the first symbol 210. Accordingly, there may occur interferences such as missing a part of data 232 of the second symbol, and mistakenly receiving data of another symbol during the time period 233, and including the mistakenly received data in the data of the second symbol. Also, a third symbol 240 transmitted by a third terminal may have a transmission delay value smaller than that of the first symbol 210. Accordingly, there may occur interferences such as missing a part of data 242 of the third symbol and mistakenly receiving data of another symbol during a time period 243, and including the mistakenly received data in the data of the third symbol.

Figure 3:
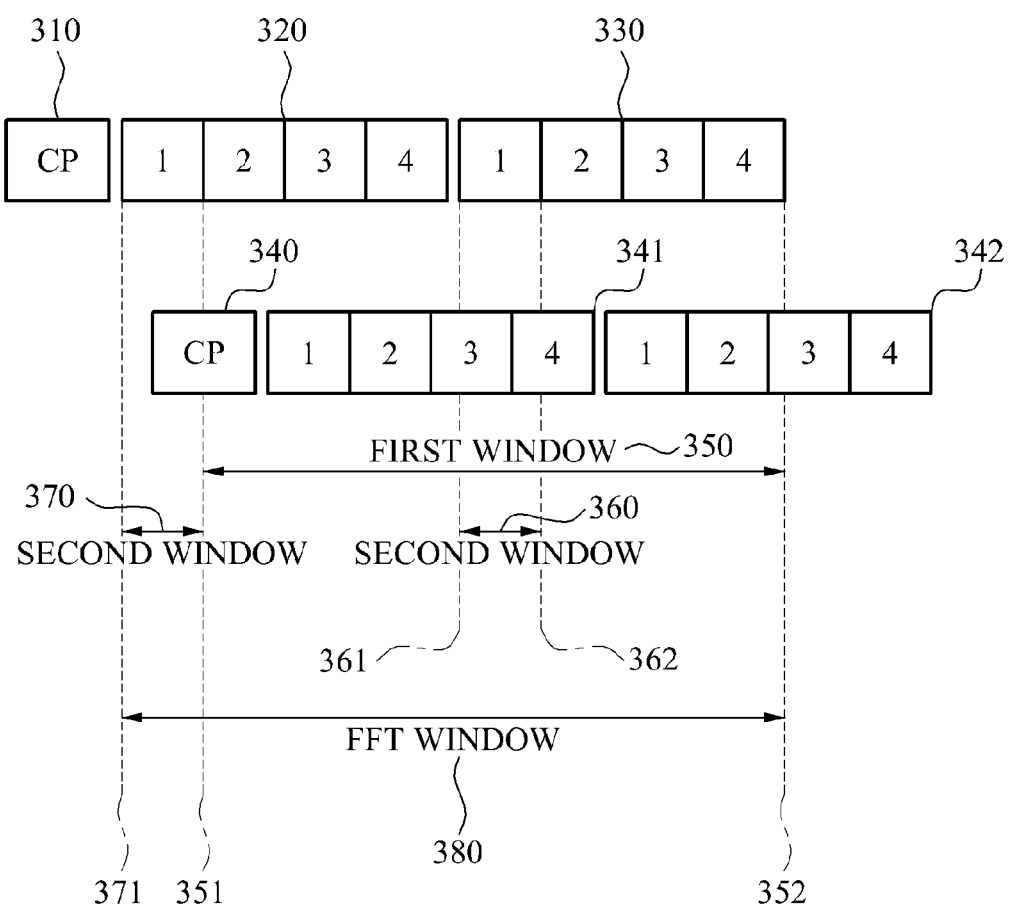
FIG. 3 is a diagram illustrating an example of a base station restoring multi-cell transmission data.

FIG. 3 illustrates an example of a base station restoring multi-cell transmission data.

Referring to FIG. 3, a terminal may generate multi-cell transmission data 320 and 330 by repeating a data group 320 including a plurality of data bits. As illustrated in FIG. 3, the data group 320 including four bits may be repeated once to thereby generate the multi-cell transmission data 320 and 330. The same numbered data bits included in the respective data groups 320 and 330 have the same value.

The terminal may generate a cyclic prefix signal using the data bits included in the data group, and generate an uplink frame by time-division multiplexing the cyclic prefix signal and the multi-cell transmission data 320 and 330.

As illustrated in the example of FIG. 3, the base station receives first symbols 310, 320, and 330 and second symbols 340, 341, and 342. In a first example, a base station may set, as a window duration, a duration 380 corresponding to the multi-cell transmission data 320 and 330 from among the first symbols 310, 320, and 330, and decode data corresponding to the set window duration.

Referring to FIG. 3, both data groups 320 and 330 from among the data groups included in the first symbols 310, 320, and 330 are included in the set window duration 380. Accordingly, uplink data included in the first symbol may be successfully received. Also, data group 341 from among the data groups included in the second symbols 340, 341, and 342 is included in the set window duration 380. Accordingly, uplink data included in the second symbol may be successfully received.

However, in order to compensate for transmission delay between the terminal and the base station, a base station may predict a transmission delay prior to data transmission. Thus, a base station may predict a point in time to start receiving a signal transmitted by a terminal.

For example, the base station may set a window duration based on the transmission delay from the respective terminals. The base station may set, as a starting point in time of a first window duration including a maximum transmission delay 351 having a transmission delay value based on the respective terminals. Also, the base station may set, as an end point in time of the first window duration, an end point in time 352 of the multi-cell transmission data 320 and 330.

The base station may set a second window duration 360. The second window duration 360 corresponds to the window 370 and includes data bit of '1' of the first data bit group 330 that is not included in the first window duration 350. That is, the base station may set, as the second window duration 360, a duration from a starting point in time 361 of the first bit of the data bits included in the second data group to an end point in time 362 of the first bit.

The base station may generate/restore the data located at second window duration 370 by copying the data bits from second window duration 360 that were not included in the first window duration 350.

Thus, the base station may restore window duration 380, based on the first window duration 350 and the second window duration 360. When the symbol received from the terminal is modulated in an OFDM scheme, the base station may perform a Fourier transformation on the data bits corresponding to the widow duration to thereby restore the data bits. That is, the base station may determine the set window duration as a fast Fourier transformation (FFT) window that corresponds to the duration 380.

In this example, symbol 320 and symbol 330 are repeated transmissions of data bits 1, 2, 3, and 4. Accordingly, even though first window 350 only includes data bits 2, 3, and 4, of symbol 220, the fourth bit (data bit 1), may be restored by setting the fourth bit equal to the second window 360 that corresponds to the duration of data bit 1 of symbol 330. Thus, data bits that are missed may be restored using the repeated transmission/restoration scheme.

Accordingly, using the repeated transmission/restoration scheme, a base station may receive data only during a duration period a first window, such as the window 350, instead of receiving data during an entire duration, such as the window 380. The repeated signals may be used to restore a one or more data bits that were not received during the first window. Thus, the base station does not need to receive data for an entire transmission period, thereby conserving power, and saving energy cost.

Figure 4:
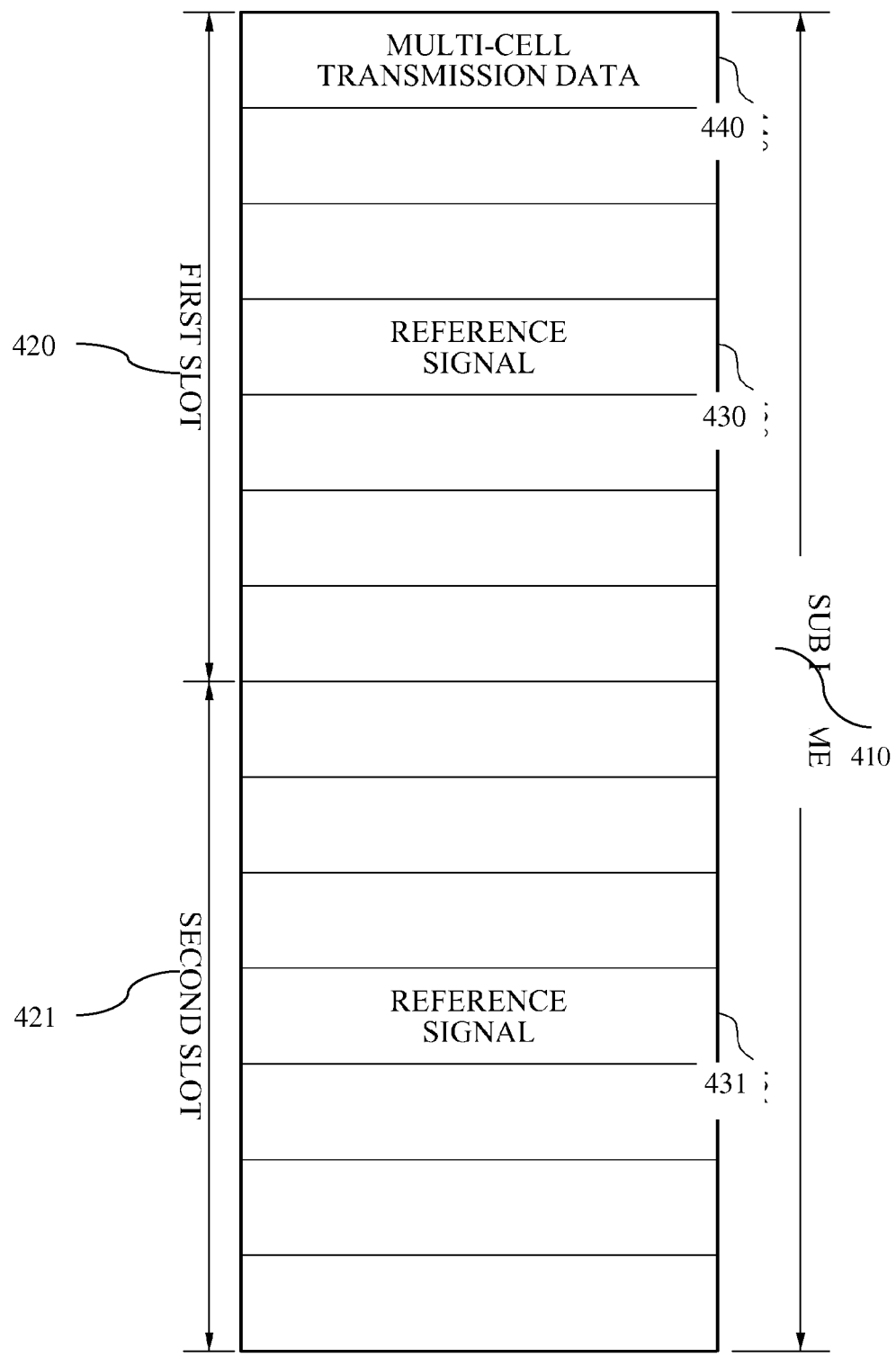
FIG. 4 is a diagram illustrating an example of a sub-frame including multi-cell transmission data.

FIG. 4 illustrates an example of a sub-frame including multi-cell transmission data.

Referring to FIG. 4, a terminal may transmit, to a plurality of base stations, a sub-frame 410. The sub-frame may act as an uplink frame. For example, the terminal may generate the uplink frame by time-division multiplexing multi-cell transmission data 440, reference signals 430 and 431, and uplink data. The remaining parts of the frame, excluding the multi-cell transmission data 440 and the reference signals 430 and 431 from the sub-frame 410, may be used for uplink data.

The sub-frame may include one or more slots for uplink data. In the example shown in FIG. 4, the sub-frame 410 includes two slots 420 and 421, and the respective slots 420 and 421 may include a plurality of uplink data.

In the example shown in FIG. 4, the terminal may assign the multi-cell transmission data 440 to an initial part of the sub-frame 410, and assign the uplink data and the reference signals 430 and 431 to the remaining parts of the sub-frame 410. To transmit the multi-cell transmission data 440, the terminal may assign at least one OFDM symbol or at least one Single Carrier Frequency Division Multiplexing (SC-FDM) symbol.

The base station may estimate a state of a radio channel from the terminal to the base station based on the reference signal, and decode the uplink data based on the estimated state of the radio channel.

Figure 5:
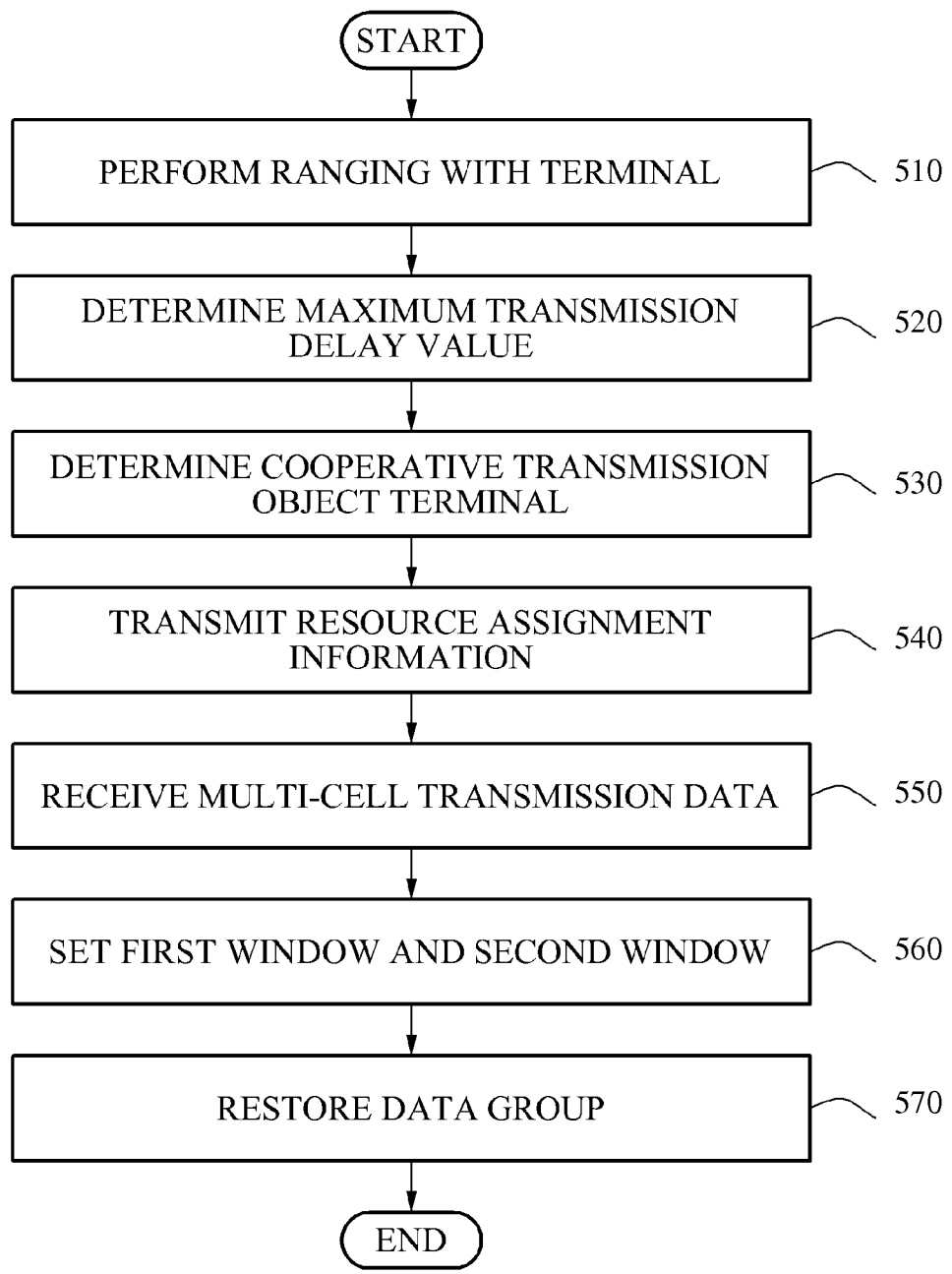
FIG. 5 is a flowchart illustrating an example method of a base station receiving multi-cell transmission data.

FIG. 5 illustrates an example of a base station receiving multi-cell transmission data.

In operation 510, the base station may perform ranging with a terminal having a corresponding base station as a serving base station, or with a terminal having a cooperative base station as the serving base station. The base station may transmit a ranging signal to the terminal, and in response the terminal may transmit a response signal to the base station. The base station may estimate a transmission delay from the respective terminals based on the period of time from transmitting the ranging signal to receiving the response signal.

In operation 520, the base station may determine a transmission delay value. For example, the base station may determine a maximum value from among the transmission delay values of the respective terminals.

In operation 530, the base station may determine a cooperative transmission object terminal from among the plurality of terminals. The terminal determined as the cooperative transmission object terminal may transmit uplink data to a plurality of base stations. Each of the plurality of base stations may receive data from the terminal according to the cooperative reception scheme.

In operation 540, the base station may transmit resource assignment information to the cooperative transmission object terminal. For example, the resource assignment information may include information including a time duration while the multi-cell transmission data is transmitted. Also, the resource assignment information may include information including a frequency band in which the multi-cell transmission data is transmitted.

In operation 540, the base station may transmit, to the cooperative transmission object terminal, a number of times that each data group is repeated, that is, the repetition frequency. The repetition frequency with respect to each data group may be determined depending on the maximum transmission delay.

In operation 550, the base station may receive, from the cooperative transmission object terminal, the multi-cell transmission data. For example, the cooperative transmission object terminal may enable the multi-cell transmission data to be included in a sub-frame such as the sub-frame illustrated in FIG. 4, and transmit the multi-cell transmission data to the base station.

In operation 560, the base station may set a window duration with respect to the multi-cell transmission data received from the cooperative transmission object terminal. For example, the base station may set a first window and a second window with respect to the multi-cell transmission data as illustrated in the example shown in FIG. 3. The window duration may be set based on the first window and the second window.

In operation 570, the base station may restore the data group transmitted by the terminal. When the terminal modulates each data group using an OFDM scheme, the base station may determine, as an FFT window, the window duration set in operation 560, and perform an FFT operation to restore the data group.

Figure 6:
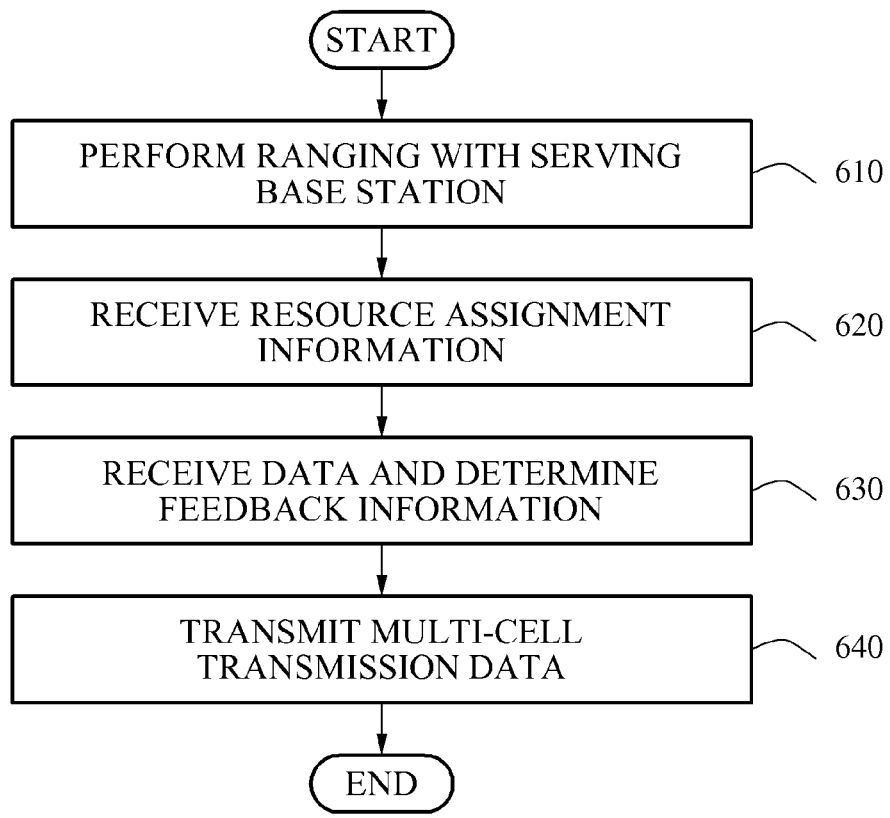
FIG. 6 is a flowchart illustrating an example method of a terminal transmitting multi-cell transmission data.

FIG. 6 illustrates an example method of a terminal transmitting multi-cell transmission data.

In operation 610, the terminal performs ranging with a serving base station. For example, the terminal may receive a ranging signal from the serving base station, and transmit, to the serving base station, a response signal in response to the ranging signal. The serving base station may estimate a transmission delay of the terminal based the period of time from transmitting the ranging signal to receiving the response signal.

In operation 620, the terminal receives resource assignment information from the serving base station. For example, the terminal may receive a position of the multi-cell transmission data included in a sub-frame as the resource assignment information.

In operation 630, the terminal receives downlink data from the serving base station, and determines whether an error of the downlink data occurs. The terminal may determine, as feedback information, information about whether the error of downlink data occurs.

In operation 640, the terminal transmits the multi-cell transmission data to a plurality of base stations. For example, the terminal may generate the multi-cell transmission data by repeating a data group including a plurality of data bits. Each of the data bits included in the data group may include information about whether the error of the downlink data occurs.

Hereinafter, operations of the terminal transmitting the multi-cell transmission data to the plurality of base stations are described with reference to FIG. 7.

Figure 7:
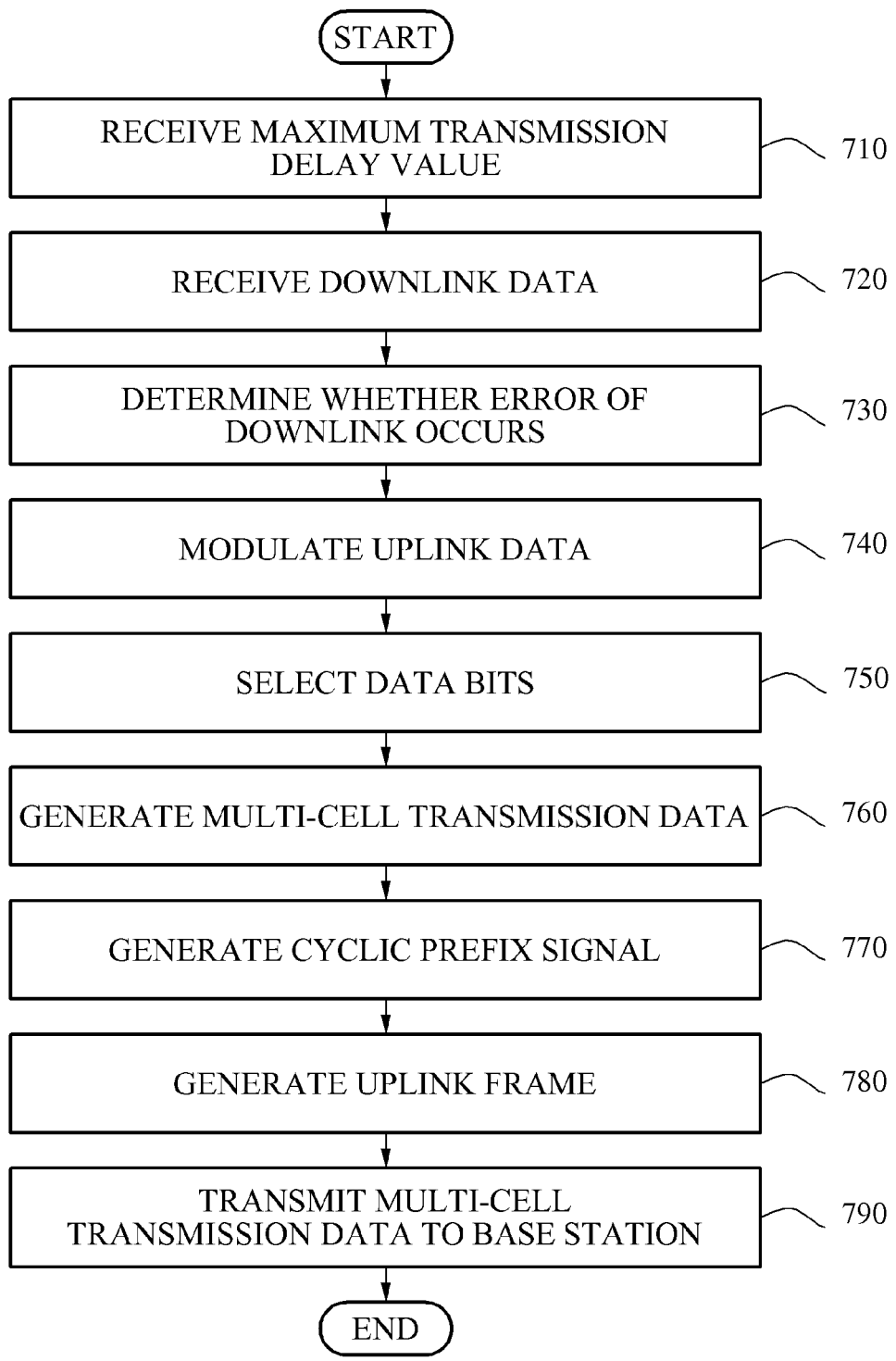
FIG. 7 is a flowchart illustrating an example method of a terminal transmitting multi-cell transmission data.

FIG. 7 illustrates an example method of a terminal transmitting multi-cell transmission data.

In operation 710, the terminal receives a maximum transmission delay value from a base station. The maximum transmission delay value may designate a maximum value of transmission delay values from the terminal to the base station.

In operation 720, the terminal receives downlink data from the base station. For example, the terminal may receive the same downlink data from a plurality of base stations.

In operation 730, the terminal determines whether an error of the downlink data occurs.

In operation 740, the terminal modulates the uplink data. For example, the terminal may modulate the downlink data using an OFDM scheme. The uplink data may include information about whether the error of the downlink data occurs.

In operation 750, the terminal selects data bits from among the uplink data. For example, the uplink data may be modulated using the OFDM scheme, and the terminal may select a plurality of data bits from the uplink data based on an order of carrier frequencies of the uplink data. For example, the terminal may select the uplink data of an odd-numbered frequency data bit from among the uplink data. The terminal may group the selected data bits as the data group.

In operation 760, the terminal generates the multi-cell transmission data by repeating the data group. For example, the terminal may determine a number of times the data group is repeated, depending on the maximum transmission delay value. For example, the greater the maximum transmission delay value is, the more the terminal may increase the number of times the data group is repeated.

In operation 770, the terminal generates a cyclic prefix signal using at least one bit from among the plurality of data bits.

In operation 780, the terminal generates an uplink frame by time-division multiplexing the cyclic prefix signal and the multi-cell transmission data.

In operation 790, the terminal may transmit the multi-cell transmission data to the plurality of base stations.

Figure 8:
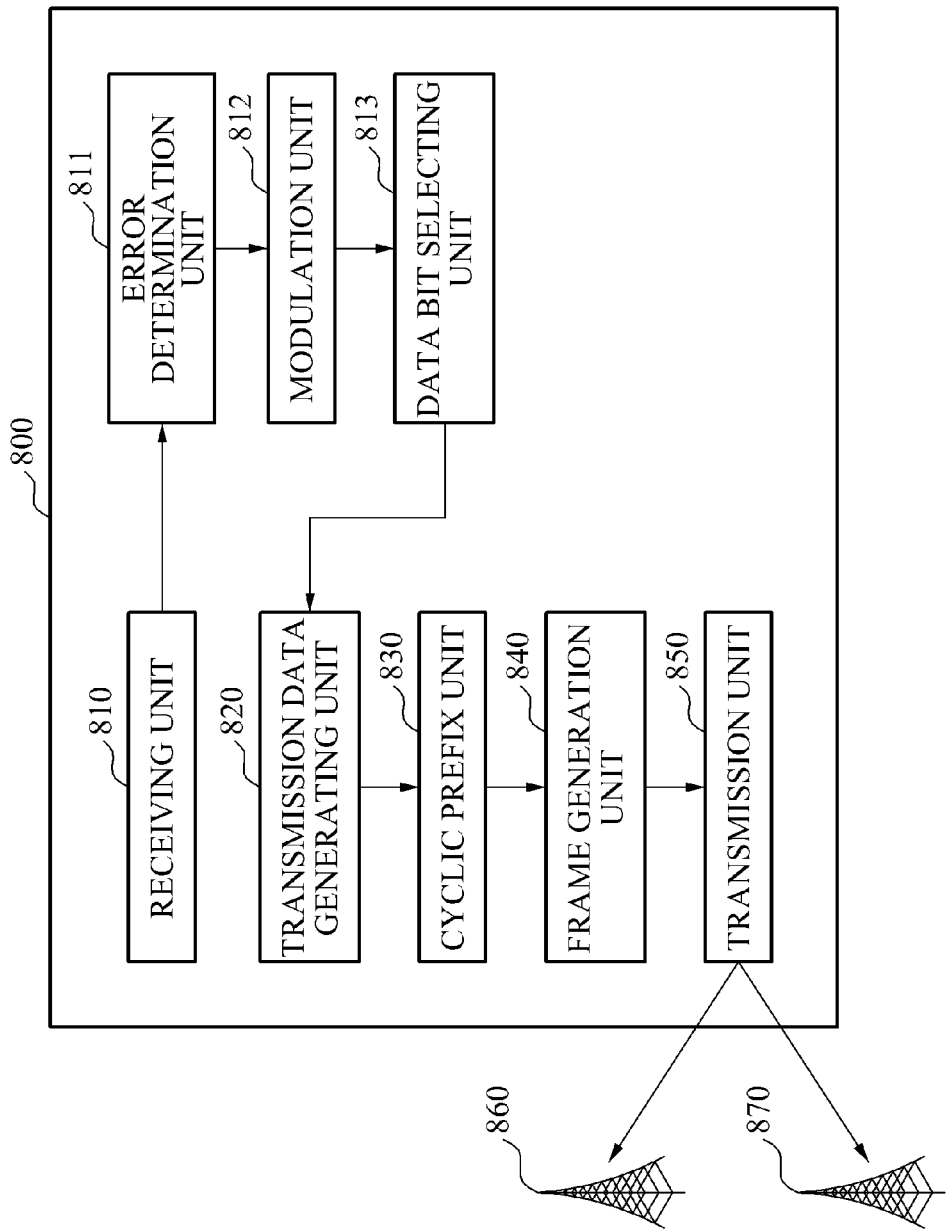
FIG. 8 is a diagram illustrating an example of a terminal.

FIG. 8 illustrates an example of a terminal. Referring to FIG. 8, the terminal 800 includes a receiving unit 810, an error determination unit 811, a modulation unit 812, a data bit selecting unit 813, a transmission data generating unit 820, a cyclic prefix unit 830, a frame generation unit 840, and a transmission unit 850.

The transmission data generating unit 820 generates multi-cell transmission data by repeating a data group including a plurality of data bits.

For example, the data group may include information about whether an error of downlink data occurs. The receiving unit 810 may receive the downlink data from a base station. The error determination unit 811 may determine whether the error of the downlink data occurs. The uplink data may include information about whether the error of the downlink data occurs.

The modulation unit 812 modulates uplink data. For example, the modulation unit 812 may modulate the uplink data using an OFDM scheme.

The data bit selecting unit 813 selects data bits from among the uplink data. For example, the data bit selecting unit 813 may select the data bit based on carrier frequencies of the uplink data. For example, the data bit selecting unit 813 may select, as the data bit, the uplink data corresponding to an odd-numbered carrier frequency or an even-numbered carrier frequency. The data bit generating unit 813 may group the selected data bits as the data group.

The cyclic prefix unit 830 generates a cyclic prefix signal using at least one bit of a plurality of data bits included in the data group. For example, the cyclic prefix unit 830 may generate the cyclic prefix signal using a final bit from among the plurality of data bits included in the data group.

The frame generation unit 840 generates an uplink frame by time-division multiplexing the cyclic prefix signal and the multi-cell transmission data.

The transmission unit 850 transmits the uplink frame to a plurality of base stations 860 and 870.

For example, the receiving unit 810 may receive a maximum transmission delay value from a serving base station 860 included in the plurality of base stations 860 and 870, and determine a number of times the data group is repeated. When a magnitude of the multi-cell transmission data is uniform, for example, the number of times the data group is repeated and a magnitude of the data group may be in inverse proportion. The data bit selecting unit 813 may determine the magnitude of the data group based on the maximum transmission delay value, and select the data bits depending on the maximum transmission delay value.

Figure 9:
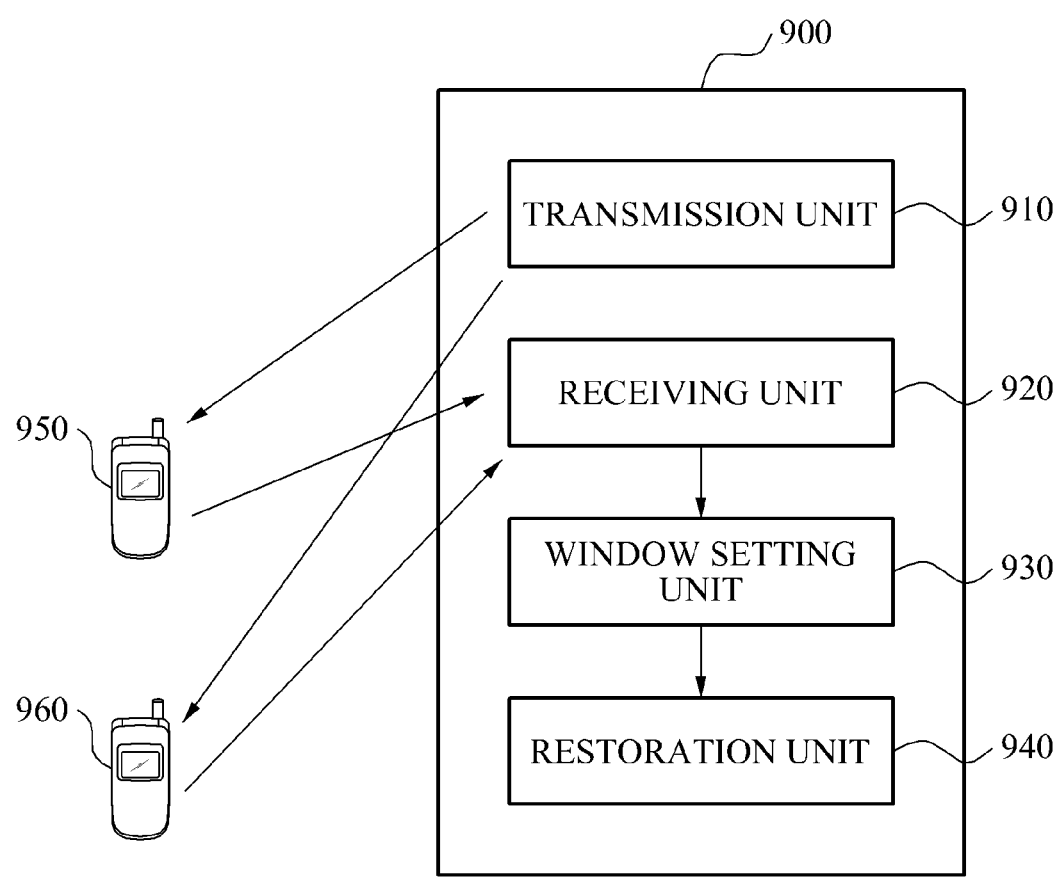
FIG. 9 is a diagram illustrating an example of a base station.

FIG. 9 illustrates an example of a base station. The base station 900 includes a transmission unit 910, a receiving unit 920, a window setting unit 930, and a restoration unit 940.

The receiving unit 920 receives, from a plurality of terminals, multi-cell transmission data. For example, the multi-cell transmission data may be generated by repeating a data group including a plurality of data bits.

The transmission unit 910 transmits downlink data to respective terminals 950 and 960. The respective terminals 950 and 960 may determine whether an error of the downlink data occurs. The respective terminals may group the data bits into a data group. The data bits may include information about whether the error of the downlink data occurs.

The window setting unit 930 sets a window duration with respect to the multi-cell transmission data based on transmission delay from the respective terminals 950 and 960.

For example, the window setting unit 930 may determine, as a starting point in time of a first window duration, a maximum value of the transmission delay values from the respective terminals 950 and 960, and determine, as an end point in time of the first window duration, an end point in time of the multi-cell transmission data, to thereby determine the first window duration.

Also, the window setting unit 930 may set, as a second window duration, data bits not included in the first window duration from among the repeated data groups.

The window setting unit may set, as the FFT window duration, the first window duration and the second window duration.

The restoration unit 940 restores the data group using the multi-cell transmission data corresponding to the window duration. For example, the respective data bits may be modulated in the OFDM scheme. In this example, the restoration unit 940 may determine the widow duration as an FFT window duration, and perform an FFT operation to thereby restore the data bits.

As described herein, the term "units" may refer to hardware units, software units, or a combination thereof. The hardware units and the software units are units that are capable of being controlled by a processor.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a to mobile Dynamic Random Access Memory (DRAM), and the like. The memory controller and the flash memory device may constitute a solid state drive/disk (SSD) that uses a non-volatile memory to store data.

The above described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A terminal, comprising:
a transmission data generating unit configured to generate multi-cell transmission data by repeating a data group comprising a plurality of data bits, the repeated data group comprising at least two repetitions of the plurality of data bits, and the number of repetitions of the plurality of data bits generated is determined based on a transmission delay of the terminal or at least one other terminal; and a transmission unit configured to transmit the multi-cell transmission data comprising the repeated data group to each of a plurality of base stations, wherein a total window duration is set while the multi-cell transmission data is received, based on the transmission delay of the terminal or the at least one other terminal, a maximum value of the transmission delay is determined to be a starting time of a first window duration, an end point in time of the multi-cell transmission data is determined to be an end time of the first window duration, data bits not included in the first window duration from among the repeated data groups are set as a second window duration, and the first window duration and the second window duration are set as the total window duration.

2. The terminal of claim 1, further comprising:
a cyclic prefix unit configured to generate a cyclic prefix signal using at least one bit of the plurality of data bits; and
a frame generation unit configured to generate an uplink frame by time-division multiplexing the cyclic prefix signal and the multi-cell transmission data.

3. The terminal of claim 1, further comprising:
a receiving unit configured to receive downlink data from a serving base station and a cooperative base station, from among the plurality of base stations; and
an error determination unit configured to determine whether an error of the downlink data occurs,
wherein the plurality of data bits comprises information about whether an error of the downlink data occurs.

4. The terminal of claim 1, further comprising:
a modulation unit configured to modulate uplink data in an orthogonal frequency division multiplexing (OFDM) scheme; and
a data bit selecting unit configured to select the plurality of data bits from the uplink data based on an order of carrier frequencies of the uplink data.

5. The terminal of claim 4, wherein the data bit selecting unit is further configured to select uplink data having an odd-numbered carrier frequency, as the plurality of data bits, or select uplink data having an even-numbered carrier frequency, as the plurality of data bits.

6. The terminal of claim 4, further comprising:
a receiving unit configured to receive, from a serving base station included in the plurality of base stations, a maximum transmission delay value,
wherein the data bit selecting unit is further configured to select the plurality of data bits in accordance with the maximum transmission delay value.

7. A base station, comprising:
a receiving unit configured to receive, from a plurality of terminals, multi-cell transmission data generated by repeating a data group comprising a plurality of data bits;
a window setting unit configured to set a total window duration during which the multi-cell transmission data is received, based on transmission delay values from each of the plurality of terminals; and
a restoration unit configured to restore the data group using the multi-cell transmission data corresponding to the total window duration,
wherein the window setting unit is further configured to:

determine, as a starting time of a first window duration, a maximum value from the transmission delay values, determine, as an end time of the first window duration, an end point in time of the multi-cell transmission data, set, as a second window duration, data bits not included in the first window duration from among the repeated data groups, and set, as the total window duration, the first window duration and the second window duration.

8. The base station of claim 7, further comprising:
a transmission unit configured to transmit downlink data to the plurality of terminals; and
a receiving unit configured to receive the plurality of data bits comprising information about whether an error of the downlink data occurs.

9. A data transmission method of a terminal, the data transmission method comprising:
generating multi-cell transmission data by repeating a data group comprising a plurality of data bits, the repeated data group comprising at least two repetitions of the plurality of data bits, and the number of repetitions of the plurality of data bits generated is determined based on a transmission delay of the terminal or at least one other terminal; and
transmitting the multi-cell transmission data comprising the repeated data group to each of a plurality of base stations,
wherein a total window duration is set while the multi-cell transmission data is received, based on the transmission delay of the terminal or the at least one other terminal,
a maximum value of the transmission delay is determined to be a starting time of a first window duration,
an end point in time of the multi-cell transmission data is determined to be an end time of the first window duration,
data bits not included in the first window duration from among the repeated data groups are set as a second window duration, and
the first window duration and the second window duration are set as the total window duration.

10. The data transmission method of claim 9, further comprising:
generating a cyclic prefix signal using at least one bit of the plurality of data bits; and
generating an uplink frame by time-division multiplexing the cyclic prefix signal and the multi-cell transmission data,
wherein the transmitting further comprises transmitting the uplink frame.

11. The data transmission method of claim 9, further comprising:
receiving downlink data from a serving base station and a cooperative base station, from among the plurality of base stations; and
verifying whether an error of the downlink data occurs,
wherein the plurality of data bits comprises information about whether an error of the downlink data occurs.

12. The data transmission method of claim 9, further comprising:
modulating uplink data in an OFDM scheme; and
selecting the plurality of data bits from the uplink data based on a carrier frequency of the uplink data.

13. The data transmission method of claim 12, wherein the selecting selects uplink data having an odd-numbered carrier frequency, as the plurality of data bits, or selects uplink data having an even-numbered carrier frequency, as the plurality of data bits.

14. The data transmission method of claim 12, further comprising:
  receiving a maximum transmission delay value from a serving base station included in the plurality of base stations,
  wherein the selecting selects the plurality of data bits in accordance with the maximum transmission delay value.

15. A non-transitory computer-readable storage medium having stored therein program instructions to cause a processor to implement the data transmission method of claim 9.

16. The base station of claim 7, wherein total window duration comprises an amount of time that is less in time than an amount of time it takes to transmit the entire multi-cell transmission data, and
  the restoration unit is configured to restore the entire multi-cell transmission data using only the multi-cell transmission data received during the total window duration.

17. A data communication method of a base station, the data communication method comprising:
  receiving, from a plurality of terminals, multi-cell transmission data generated by repeating a data group comprising a plurality of data bits;
  setting a total window duration during which the multi-cell transmission data is received, based on transmission delay values from each of the plurality of terminals; and
  restoring the data group using the multi-cell transmission data corresponding to the total window duration,
  determining, as a starting time of a first window duration, a maximum value from the transmission delay values,
  determining, as an end time of the first window duration, an end point in time of the multi-cell transmission data,
  setting, as a second window duration, data bits not included in the first window duration from among the repeated data groups, and
  setting, as the total window duration, the first window duration and the second window duration.

* * * * *